Nov. 4, 1924. 1,514,345
F. G. SALERNO
MACHINE FOR APPLYING A TOP COATING OF COMMINUTED MATERIAL TO
CONFECTION COATED WAFERS
Filed June 10, 1921 4 Sheets-Sheet 1
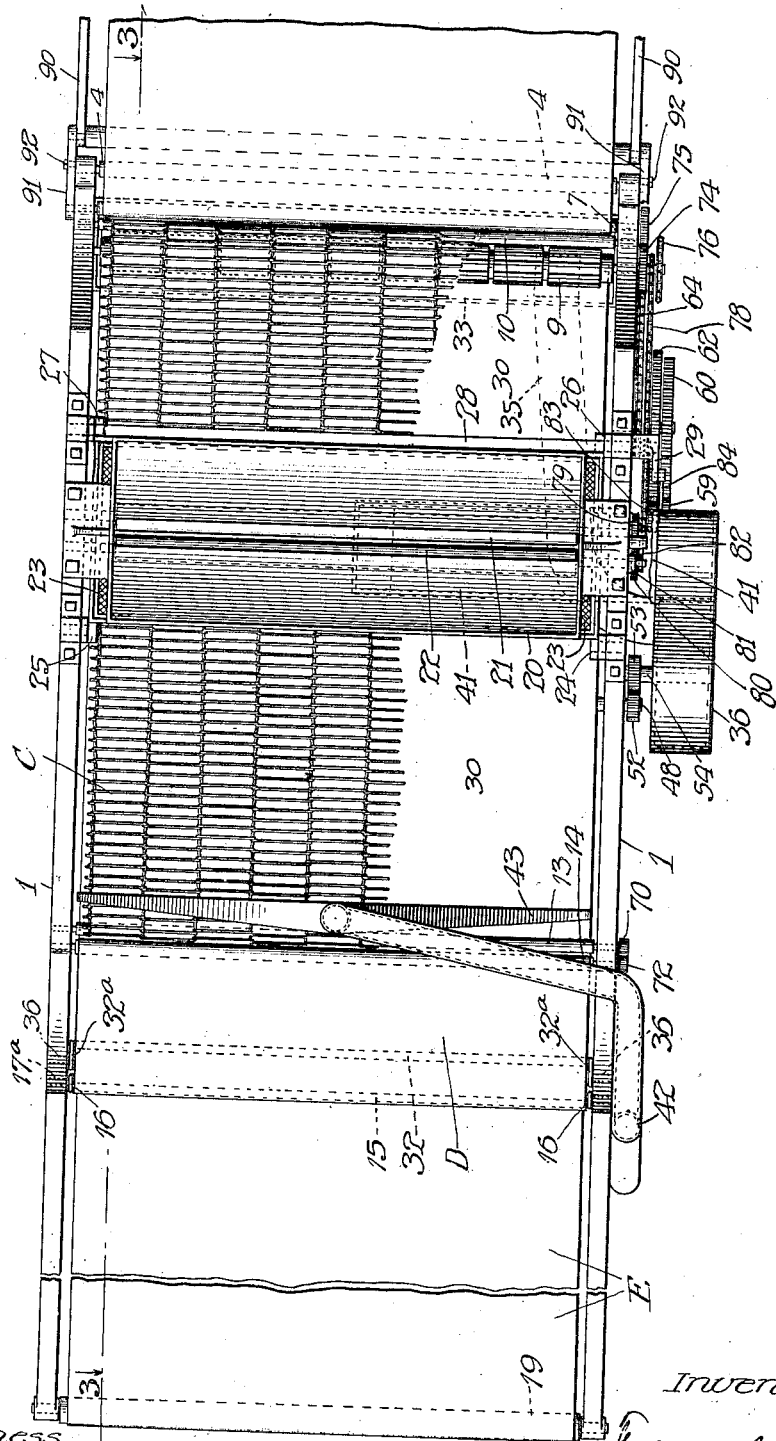

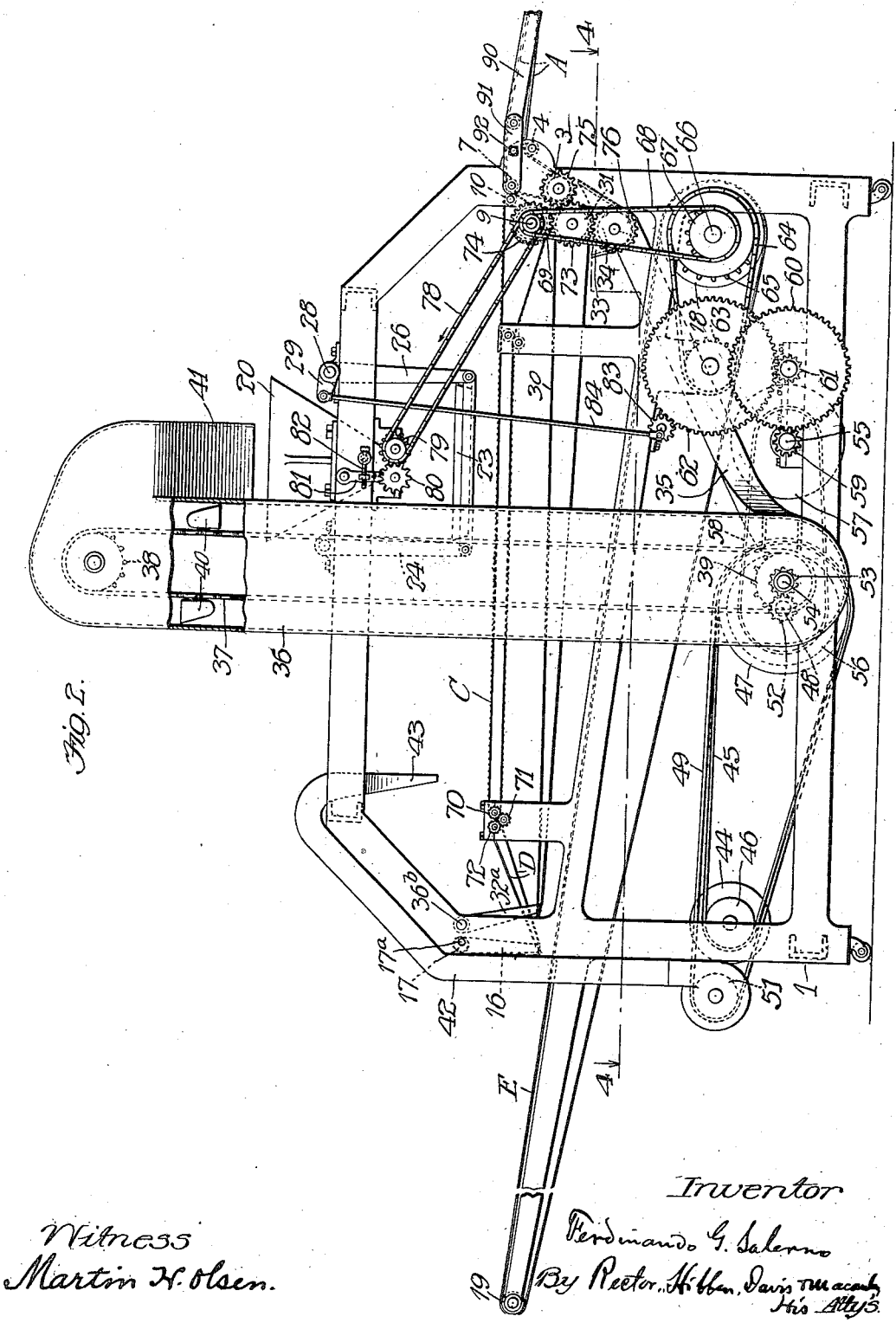

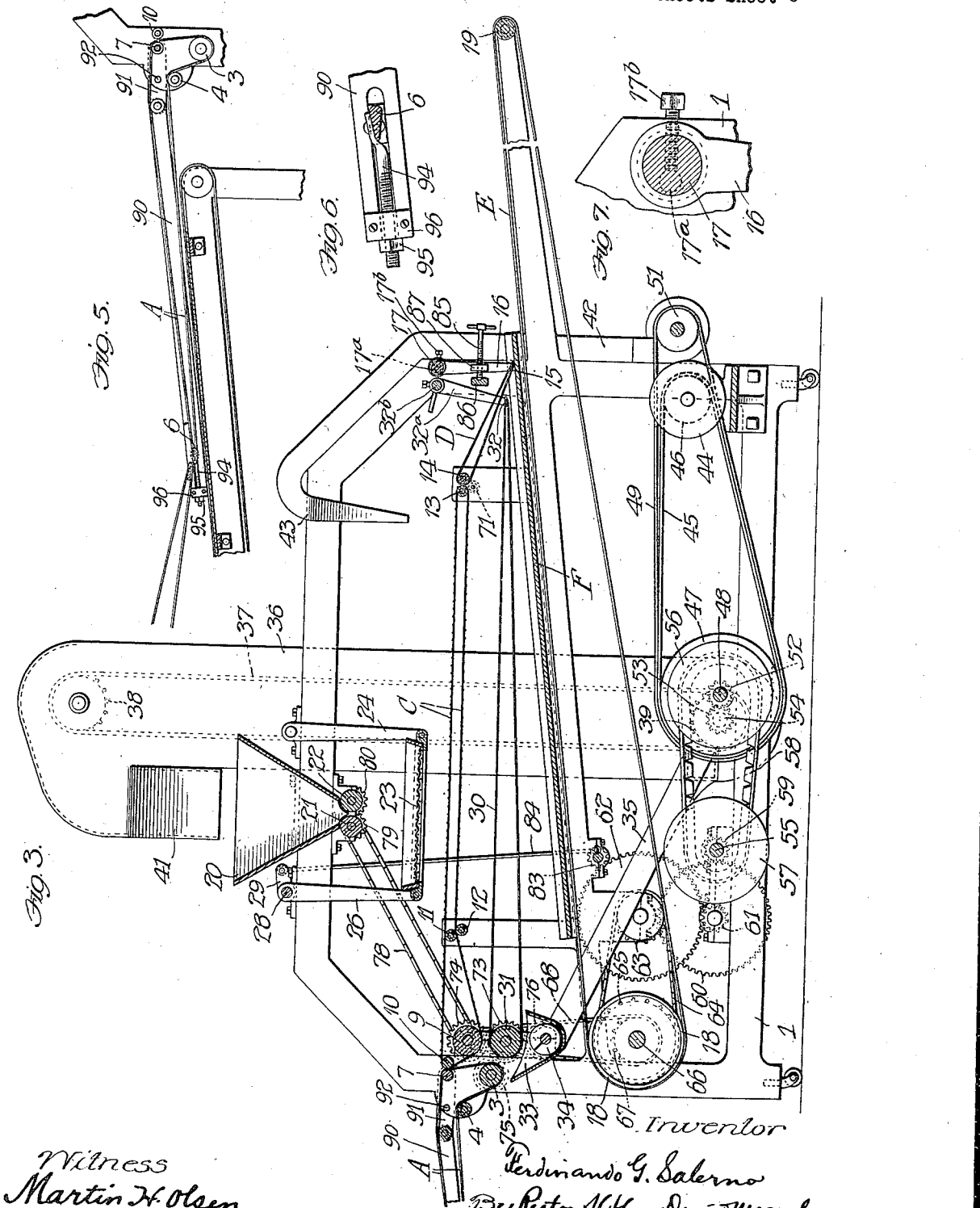

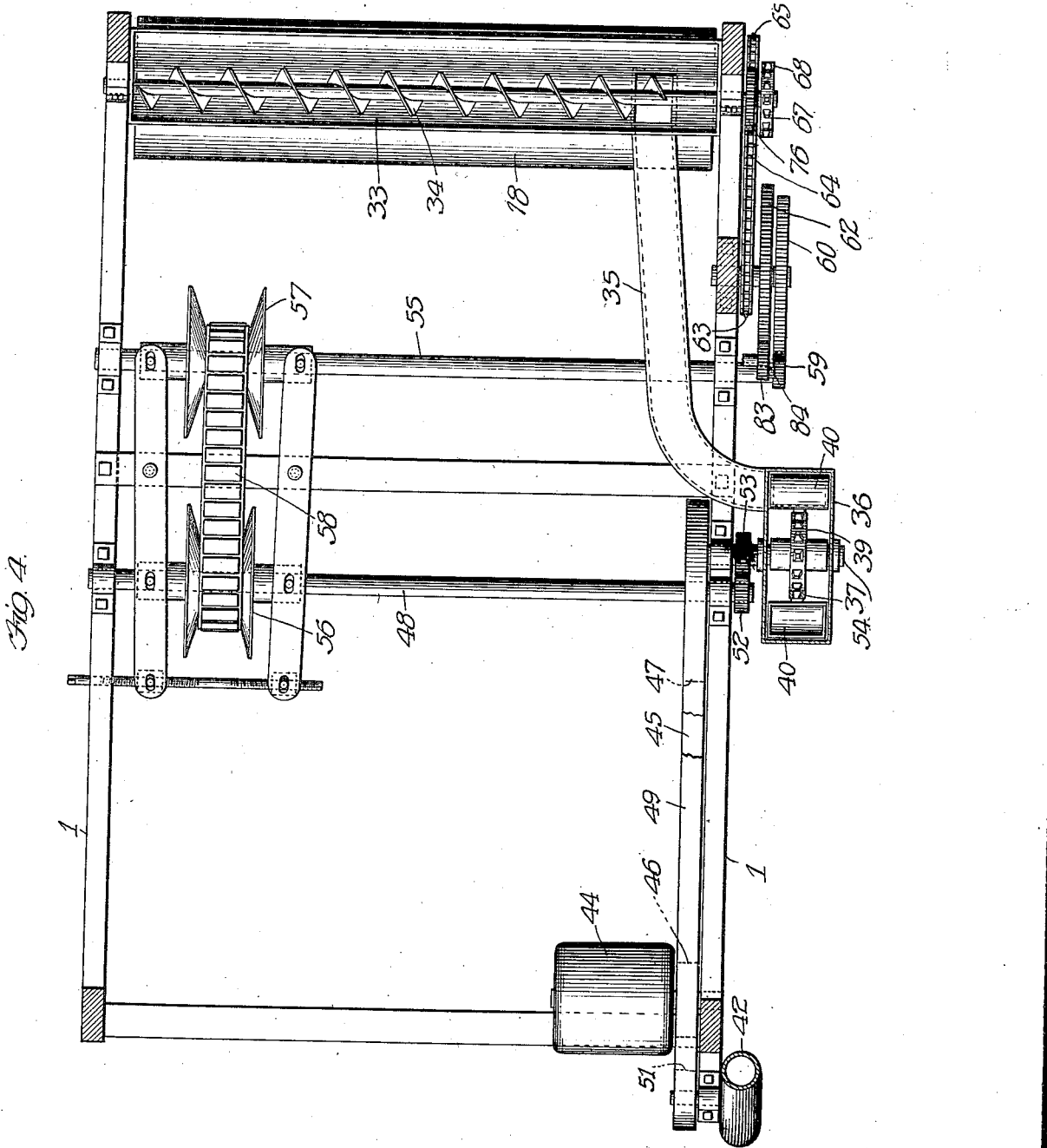

Patented Nov. 4, 1924.

1,514,345

UNITED STATES PATENT OFFICE.

FERDINANDO G. SALERNO, OF CHICAGO, ILLINOIS.

MACHINE FOR APPLYING A TOP COATING OF COMMINUTED MATERIAL TO CONFECTION-COATED WAFERS.

Application filed June 10, 1921. Serial No. 476,424.

*To all whom it may concern:*

Be it known that I, FERDINANDO G. SALERNO, a citizen of the United States, residing at Chicago, in the county of Cook and State of Illinois, have invented certain new and useful Improvements in Machines for Applying a Top Coating of Comminuted Material to Confection-Coated Wafers, of which the following is a specification.

My invention relates to a novel topping machine, or machine for applying a top coating of shredded cocoanut or other comminuted material such as broken nut kernels, shredded raisins, currants, etc., to cakes covered with an under coating of icing, jelly, chocolate paste, or other confections of a plastic, adhesive character, and is adapted to be operated in connection with and as an attachment to a machine for applying the under coating of icing or other confection to the top of the cakes. The general purpose and object of my invention is the production of a machine which will accomplish the results in view more rapidly and economically than they can be done by hand or in any other manner known to me, and which is adapted to be used in bakeries and factories in connection with confection coating machines for the production of different variations of fancy coated bakery goods. With this object in view I have designed and invented the novel topping machine illustrated in the accompanying drawings and hereinafter more particularly described, and which embodies my invention in a desirable and practical form. My invention resides in the novel arrangement and construction of the parts of the machine, the new combinations and sub-combinations of cooperating elements through which the results to be attained are achieved, as more particularly pointed out in the appended claims, it being understood, however, that variations in the form and arrangement of certain parts are possible without departing from the spirit of my invention. I therefore desire to embrace within the scope of my claims all substitutions of equivalent element or variations from the particular construction described which do not affect the substantial identity of the invention.

In the accompanying drawings Figure 1 is a plan view of my novel machine; Fig. 2 is an elevation of the left side of the machine; Fig. 3 is a longitudinal section of the machine on the line 3—3 of Fig. 1, looking in the direction of the arrow; Fig. 4 is a horizontal section of the machine, on the line 4—4 of Fig. 2; Fig. 5 is a detail side view of the receiving belt and associated parts in operative relation to adjacent portions of a confection-coating machine; Fig. 6 is a detail of a stretcher bolt; and Fig. 7 is a cross-section of an eccentrically pivoted bearing shaft.

Like reference characters indicate like parts on all the figures of the drawings.

Briefly outlining the general organization of the machine before proceeding to a detailed description thereof, it will be understood that the cookies or wafers, freshly coated with deposits of icing, jelly, or any desired suitable confection through the agency of a suitable coating machine, such as that described in my Patent No. 1,303,599, dated May 13, 1919, are delivered in successive rows by a conveyor belt of such machine to a traveling receiving belt of my present machine. From this receiving belt the cakes pass to a meshed wire conveyor belt which conducts the cakes underneath and past a vibrating screen which is supplied with shredded cocoanut and sprinkles it upon the cakes, thence past a blower which removes the shredded material not adherent to the coating, and the cakes then pass across a transfer belt and onto trays arranged upon a delivery belt, these trays being placed upon the delivery belt and removed therefrom by an attendant as the work proceeds, in the manner usual in machines of this general class.

The vibrating screen above referred to is supplied from a hopper which is replenished from time to time, and that portion of the shredded cocoanut which does not fall upon and adhere to the cakes falls away or is blown from them through the meshes of the wire conveyor on to the top reach of an endless collecting apron or belt traveling downwardly around a roller disposed above a trough in which is arranged a spiral conveyor. This conveyor delivers the material received from the belt through an inclined chute to an elevating device which returns it to the feed hopper.

Proceeding now to a detailed description of the machine as illustrated in the drawings, the frame 1, which consists of vertical and horizontal side members and horizontal transverse members suitably arranged to support the various moving and stationary parts of the machine, is preferably, and as shown, mounted upon castors in order that the machine may be readily moved up to a stationary confection-coating machine for attachment thereto. To provide for such attachment of my present machine to the confection-coating machine, the endless receiving belt A passes in a rearward loop (the delivery end being considered the rear end of the machine) downwardly around a driving roller 3, thence over a small idler roller 4, thence forwardly around the rounded edge of a transverse bar 6 forming part of a swinging frame which includes a pair of pivoted side bars 90, thence rearwardly over another small idler roller 7 to the driving roller. The side bars 90 in which the bar 6 is mounted are pivoted upon the front ends of a pair of short bars 91 rigidly secured to the frame by bolts 92, such side bars being slotted at their front ends to receive said bar 6. A pair of take-up bolts 94 secured to the ends of said bar 6 and arranged to be tightened through nuts 95 bearing against blocks 96 secured to the ends of the extension bars 90 are provided to adjust the tension of the belt A.

Rearwardly of the receiving belt, the open-mesh wire conveyor belt C is arranged to travel around a grooved driving roller 9, thence around a forward idler roller 10 adjacent the idler roller 7 of the receiving belt, over the upper roller 11 of a pair of idler rollers 11—12, around a rear roller 13, and back between the rollers 11 and 12 to the driving roller. Rearwardly of the wire conveyor is arranged the transfer belt D, which passes around a small driving roller 14 adjacent the roller 13 of the wire conveyor. The rear end of the transfer belt passes around the cross-member 15 of a bail having side arms 16 formed with hubs pivotally adjustable upon a cross rod or shaft 17, which is formed with eccentric trunnions 17ᵃ at its ends pivotally mounted in the machine frame. By rocking the shaft upon its trunnions the bail, and consequently the rear end of the transfer belt, may be vertically adjusted, a set screw 17ᵇ being employed to secure the trunnions in the position to which they have been set. In order to take up slack in the transfer belt I have provided a couple of adjusting bolts 85, one adjacent each arm 16, which bear at their forward ends against a stationary frame bar 86 and have screw-threaded bearing in blocks 87 secured to said arms.

The delivery belt E, arranged to support the removable trays F which receive the cakes from the transfer belt, passes around a drum 18 at its forward end and its rear end engages a small idler roller 19 journaled in opposite frame brackets extending rearwardly from the main frame of the machine.

The mechanism through which the shredded cocoanut or other granular material is deposited upon the coated cakes as they are conveyed through the machine will next be described. The sides of the supply hopper 20, arranged centrally of the machine above the wire conveyor C, in the present instance incline inwardly towards the bottom, within which is arranged a pair of feed rollers 21 and 22 arranged to travel downwardly along their proximate faces, to feed the material at a uniform rate into a vibrating screen 23. This screen is pivotally supported by the lower ends of two arms 24 and 25 which are pivoted at their upper ends to the machine frame and at their lower ends to the rear end of said screen, and by arms 26 and 27 depending from and rigidly secured to the ends of a transverse rock-shaft 28 journaled in the machine frame. This rock-shaft is equipped with a horizontal rock arm 29 by which it is oscillated through connections which will later be described, for the purpose of uniformly distributing the material fed into the screen from the hopper.

Below the vibrating screen—and also below a blower which will later be described,—is a traveling collecting apron 30 in the form of an endless canvas belt, which at one end of the machine engages a driving roller 31 and at the other end passes slidingly around the rounded edge of a cross-bar 32 which forms the cross-member of a bail consisting of such bar and opposite side members 32ᵃ formed with hubs which are pivotally adjustable upon a rod or shaft 32ᵇ, extending transversely of the machine.

The apron 30 is so actuated that its top reach travels from the rear towards the front of the machine and the surplus material falling through the meshes of the wire conveyor C is collected and discharged into a conveyor trough 33 as the apron passes around the roller 31. A rotating spiral conveyor 34 arranged in this trough forces the material towards the left side of the machine, where the conveyor trough communicates with an inclined chute 35 by which the material is conveyed to the lower end of a vertical elevator casing 36. Within the casing is arranged a bucket elevator, consisting of a sprocket chain 37 engaged by an upper sprocket wheel 38 and a lower sprocket wheel 39 pivotally mounted within the casing at the top and bottom. To these chains are secured buckets 40 which are arranged to empty the material carried up by them into a chute 41 discharging into the hopper 20. The supply of material in the hopper is maintained by replenishing it from time to time by hand, as may be needed.

Near the rear end of the machine is arranged a blowing apparatus for dislodging loose material, not adherent to the coating on the wafers or resting on the joints of the wire conveyor. This blower consists of a rotary fan of any suitable type (not illustrated) arranged to force a blast of air through the pipe 42 to a cross-pipe 43 having a jet opening on its underside arranged to direct a current of air downwardly against the conveyor and rows of cakes thereon.

The operating connections for actuating the various moving parts above described are all driven by a motor 44 mounted on the machine frame and connected by a belt 45 engaging a pulley 46 on the motor shaft with a second pulley 47 fixed to a cross-shaft 48 which is journaled at its opposite ends in bearings carried by the machine frame. The fan of the blowing apparatus is also rotated through the pulley 47 by means of a belt 49 running on top of the belt 45 and engaging a pulley 51 on the shaft of the fan. The bucket elevator is operated through a pinion 52 secured to the left hand end of the shaft 48 and arranged to mesh with a pinion 53 secured to the inner end of the short shaft 54 to which the lower sprocket wheel 39 of the elevator is rigidly secured.

The other moving parts of the machine are all driven through a shaft 55 which is connected with the shaft 48 by a transmission mechanism permitting adjustment of the speed ratio between the shafts, in order that the conveyor and material-depositing mechanisms may be timed to coordinate with the particular confection-coating machine to which my present machine may at a given time be attached. A suitable connection for the purpose is the well-known Reeves variable-speed transmission, having double-coned pulleys 56 and 57 connected by a belt 58 consisting of wedge-faced blocks flexibly connected together, the bearing faces of the pulleys being capable of adjustment toward and away from each other to change the speed ratio. Secured to the left hand end of the shaft 55 is a pinion 59 meshing with a gear wheel 60 which is rigidly connected with a pinion 61, the latter meshing in turn with a gear wheel 62 fixed to a shaft to which is also secured a sprocket wheel 63. This sprocket wheel is connected by a sprocket chain 64 with a sprocket wheel 65 fast on the shaft 66 to which the driving drum 18 of the delivery belt is secured. Through the train of reduction gearing just described the delivery belt is actuated at a relatively slow speed, adjustable through the variable-speed connection.

The shaft 66 also carries at its outer end a sprocket wheel 67 which by a sprocket chain 68 is connected to a sprocket wheel 69 fixed to the shaft of the driving roller 9 of the wire conveyor. The shaft of the rear roller 13 of the wire conveyor is equipped with a pinion 70 meshing with a pinion 71 which in turn meshes with a pinion 72 fixed to the driving roller 14 of the transfer belt, for the purpose of transmitting motion to the last-mentioned belt.

The apron 30 is driven through a gear wheel 73 rigidly secured to the shaft of the driving roller 31 and meshing with a gear wheel 74 secured to the shaft 66 above mentioned.

The receiving belt A is actuated through the gear wheel 73, which meshes at its front with a gear wheel 75 fixed to the shaft of the driving roller 3 of such belt.

The same pinion or gear wheel 73 also serves to rotate the spiral conveyor 34 through a meshing gear wheel 76 secured to the extended end of the conveyor shaft.

For the purpose of actuating the feed rollers 21 and 22 above mentioned, the shaft 66 is equipped with a sprocket wheel intermediate the gear 74 and the sprocket wheel 69, the sprocket wheel first mentioned being connected by a sprocket chain 78 with a sprocket wheel fast to the shaft of the roller 21, which latter is journaled in stationary bearings. The shaft of this roller is also equipped with a pinion 79 which meshes with a pinion 80 on the shaft of the roller 22, the latter shaft being pivoted at its opposite ends in the lower ends of a pair of arms 81, the upper ends of which are pivoted to the machine frame. These arms are arranged to be angularly adjusted to vary the opening between the rollers. Any suitable means for adjustably securing the arms 81 in position may be employed, that shown consisting of adjusting bolts 82, having each a swivel bearing in the machine frame and a screw threaded bearing in the arm. The necessary range of adjustment is small, and the teeth of the pinions 79 and 80 are of such depth and form that they will mesh with sufficient accuracy in any position of adjustment of the roller 22.

The vibratory movement of the screen 23 is accomplished through a pinion 83 meshing with the gear wheel 62 and equipped with a crank pin to which is pivoted a connecting rod 84 pivoted at its upper end to the rock arm 29 before mentioned.

The effect of the blast of air from the blower, it may be mentioned, is to dislodge loose material which had not become attached to the coating of confection, and in doing so to press the adherent particles into the coating and blow a portion of those particles which were out of contact into contact, so as to form a thicker and more firmly adherent coacting than could otherwise be produced.

While I have described my novel topping machine as operating to distribute shredded cocoanut upon a layer of freshly deposited coating of a suitable adhesive confection applied to a previously baked wafer as a base; it will be understood that in the baker's and confectioner's art, deposits of a relatively stiff and suitable confection are sometimes made directly upon a conveyor belt in such manner as to serve as a suitable base for a top coating of shredded or granular material, as nut kernels, shredded cocoanut, etc., and also that suitable machines are known for forming uncooked biscuits or wafers of dough upon which it may be desired to place a top coating of such shredded materials before baking. I therefore regard such deposits of confection not made upon a base wafer, and such uncooked biscuits as the full equivalents of the confection-coated wafers mentioned above and recited in the claims.

I claim:

1. In a machine of the character described, a meshed conveyor belt arranged to transport coated wafers, a screen above said belt, means for supplying comminuted material to said screen, said screen being arranged to sprinkle such material upon wafers supported on said belt, means for collecting surplus material passing from said screen through said meshed conveyor belt, and means for returning said collected material to the source of supply.

2. In a machine of the character described, a meshed conveyor belt arranged to transport coated wafers, a vibrating screen above said belt, a hopper equipped with feeding means arranged to continuously deliver a regulated supply of comminuted material to said screen, means for collecting surplus material passing from said screen through said meshed conveyor belt, and means for returning said collected material to the source of supply.

3. In a machine of the character described, a meshed conveyor belt arranged to transport coated wafers, a hopper arranged to receive a supply of comminuted material, distributing means above said belt connected with said hopper and arranged to sprinkle the material upon wafers supported on said belt, and means for returning surplus material passing through said belt to said hopper including a conveyor below said belt and an elevator arranged to receive material from said conveyor and deliver it to said hopper.

4. In a machine of the character described, a meshed conveyor belt arranged to transport coated wafers, a hopper arranged to receive a supply of comminuted material, distributing means above said belt connected with said hopper and arranged to sprinkle the material upon wafers supported on said belt, means for collecting material passing through said belt including a transverse conveyor trough, a conveyor in said trough, and an elevator arranged to receive material from said conveyor and deliver it to said hopper.

5. In a machine of the character described, a meshed conveyor belt, a vibrating screen above said belt, a hopper equipped with feeding means arranged to continuously deliver a regulated supply of comminuted material to said screen, a traveling collecting apron having its top reach arranged below said meshed conveyor belt and vertically below said screen, a conveyor arranged to receive material collected by said apron and transfer the same laterally, and an elevator at the side of the machine arranged to receive material from the conveyor and deliver it to said hopper.

6. In a machine of the character described, a meshed conveyor belt, a vibrating screen above said belt, a hopper equipped with feeding means arranged to continuously deliver a regulated supply of comminuted material to said screen, a traveling collecting apron having its top reach arranged below said meshed conveyor belt and vertically below said screen, a conveyor trough arranged underneath the delivery end of said apron, and an elevator arranged to receive material from said trough and deliver it to said hopper.

7. In a machine of the character described, a meshed conveyor belt, a vibrating screen above said belt, a hopper equipped with feeding means arranged to continuously deliver a regulated supply of comminuted material to said screen, a traveling collecting apron having its top reach arranged below said meshed conveyor belt and vertically below said screen, a conveyor trough arranged underneath the delivery end of said apron and a conveyor in said trough, an inclined chute connected with the delivery end of said trough, and an elevator communicating with said chute and arranged to transfer material received therefrom to said hopper.

8. In a machine of the character described, a meshed conveyor belt, supply and distributing means above said belt arranged to sprinkle comminuted material upon wafers supported on said belt, blower means above said belt for dislodging excess material from said wafers, means for collecting surplus material passing through said belt, and means for returning said collected material to the source of supply.

9. In a machine of the character described, a meshed conveyor belt arranged to transport coated wafers, material supply and distributing means above said belt including a vibrating screen, blower means above said belt arranged rearwardly of said screen for dislodging excess material from said wafers, means for collecting surplus material passing through said belt, and means for returning said collected material to the source of supply.

10. In a machine of the character described and having a horizontally-disposed wafer-conveyor and a supply hopper thereabove, a screen between said hopper and conveyor, and means for supporting and vibrating said screen comprising a pair of arms pivoted to opposite sides of the frame and opposite sides of the screen adjacent one end of the latter, a rock shaft pivoted to the frame and having depending arms pivoted to the sides of the screen at its opposite end, a crank-arm secured to said rock shaft, and means for reciprocating said crank-arm.

11. In a machine of the character described and having an endless meshed conveyor belt having a loop adjacent one end of the machine arranged to engage a driving roller, an endless collecting apron below said conveyor belt having a loop arranged to engage a driving roller below said first-mentioned driving roller, a conveyor trough arranged below said second-mentioned driving roller, a spiral conveyor in said trough, said first and second mentioned driving rollers and said spiral conveyor having shafts equipped with intermeshing gears, and means for driving said train of gearing.

12. In a machine of the character described and having an endless meshed conveyor belt having a loop adjacent one end of the machine arranged to engage a driving roller, an endless collecting apron below said conveyor belt having a loop arranged to engage a driving roller below said first-mentioned driving roller, an endless receiving belt having its upper reach in alignment to the upper reach of said conveyor belt and arranged to engage a driving roller which is disposed forwardly and adjacent said second-mentioned driving roller, said first and second mentioned driving rollers having shafts equipped with intermeshing gears and said third-mentioned driving roller being provided with a gear meshing with the gear secured to said second-mentioned driving roller.

13. The process of applying a coating of comminuted solid material to confections having a plastic surface which consists in continuously passing the confections through a shower of material, and then through a blast of air of such strength as to imbed adherent particles of material in the confections and dislodge surplus material therefrom.

14. In a machine for coating with comminuted solid material confections having an adhesive surface, a traveling conveyor arranged to horizontally shift the articles to be coated, a hopper above said conveyor arranged to receive a supply of the comminuted material, distributing means for sprinkling such material upon articles passing beneath the hopper, and blower means above said conveyor rearwardly of the hopper for dislodging excess material from the coated articles and imbedding contacting particles in the adhesive surface of such articles.

15. In a machine for coating with comminuted solid material confections having an adhesive surface, a traveling conveyor arranged to horizontally shift the articles to be coated, a hopper above said conveyor arranged to receive a supply of the comminuted material, distributing means for sprinkling such material upon articles passing beneath the hopper, blower means above said conveyor rearwardly of the hopper for dislodging excess material from the coated articles and imbedding contacting particles in the adhesive surface of such articles, collecting means below said conveyor for collecting the dislodged excess material, and elevator means for automatically returning such material to said hopper.

16. In a machine of the character described, a meshed support for coated wafers, means for sprinkling comminuted material upon the wafers on said meshed support, and blower means adjacent said support arranged to imbed adherent particles of material in the coating and dislodge surplus material therefrom.

17. In a machine of the character described, a meshed support for coated wafers, means for sprinkling comminuted material upon wafers on said meshed support, blower means adjacent said support arranged to imbed adherent particles of material in the coating and dislodge surplus material therefrom, and means for automatically returning said surplus material to said sprinkling means.

18. In a machine of the character described, meshed means for supporting coated wafers, means for advancing the wafers through the machine, sprinkling means arranged to sprinkle comminuted material upon wafers supported by said meshed wafer-supporting means, blower means situated rearwardly of said sprinkling means and arranged to imbed adherent particles of material in the coating and dislodge surplus material therefrom, and means for returning said surplus material to said sprinkling means.

19. In a machine of the character described, meshed means for supporting coated wafers, means for advancing wafers through the machine, sprinkling means arranged to sprinkle comminuted material upon wafers supported by said meshed wafer-supporting means, blower means adjacent said meshed wafer-supporting means situated rearwardly of said sprinkling means and arranged to imbed adherent particles of material in the coating and dislodge surplus material therefrom, and means for returning said surplus material to said sprinkling means.

FERDINANDO G. SALERNO.